Feb. 15, 1938.  E. S. HALL  2,108,666
CONTROL SYSTEM FOR MOTOR VEHICLES
Filed Dec. 26, 1933  2 Sheets-Sheet 1
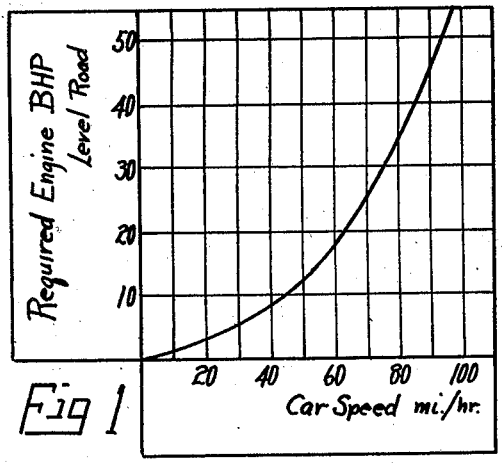
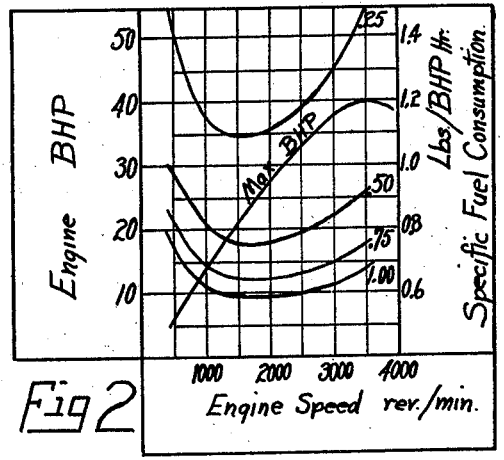
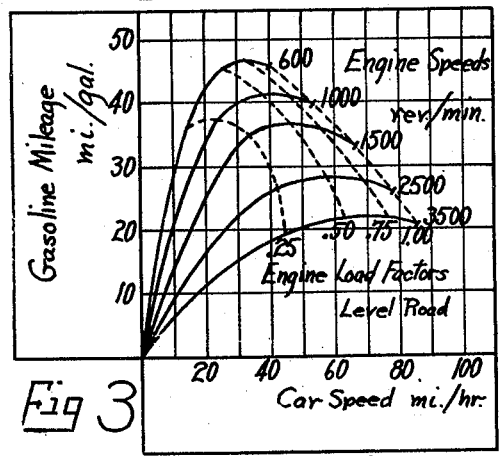
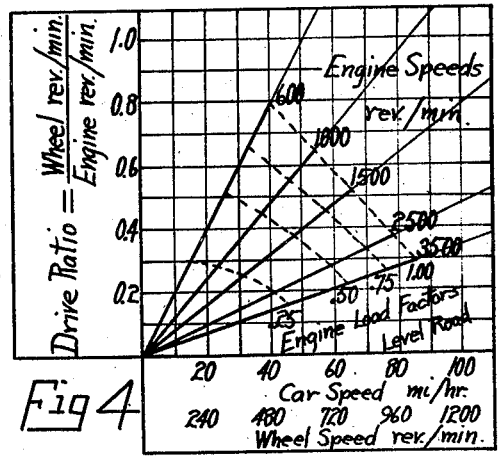
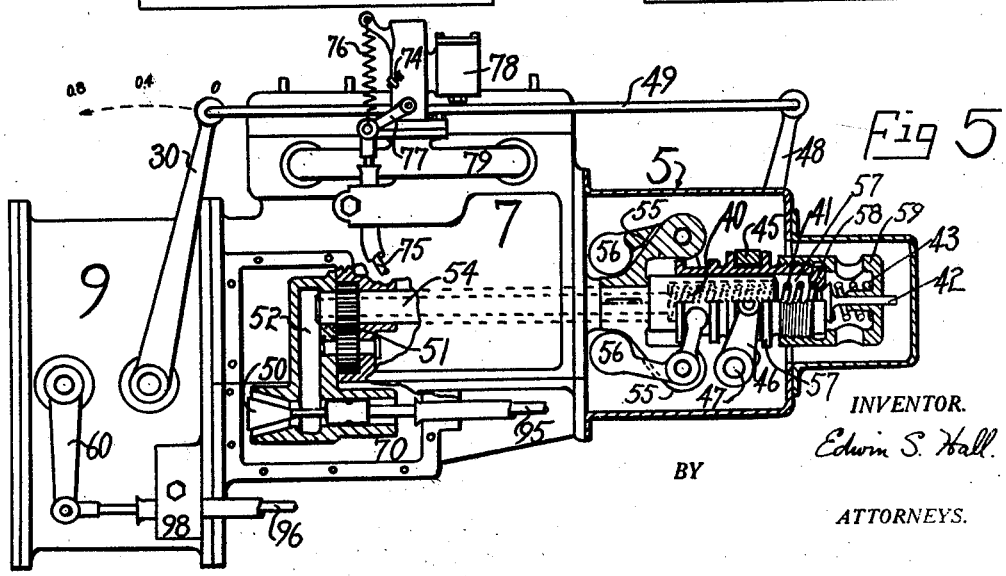
INVENTOR.
Edwin S. Hall.
BY
ATTORNEYS.

Feb. 15, 1938.  E. S. HALL  2,108,666
CONTROL SYSTEM FOR MOTOR VEHICLES
Filed Dec. 26, 1933   2 Sheets-Sheet 2

INVENTOR.
Edwin S. Hall
BY
ATTORNEYS.

Patented Feb. 15, 1938

2,108,666

UNITED STATES PATENT OFFICE 2,108,666

CONTROL SYSTEM FOR MOTOR VEHICLES

Edwin S. Hall, New Haven, Conn.

Application December 26, 1933, Serial No. 703,959

15 Claims. (Cl. 74—472)

This invention relates to control systems for motor vehicles, and may be conveniently described as applied to an automobile having the usual throttling type of internal combustion engine. However, it will be understood that the invention may be adapted to other types of vehicles, and to other types of internal combustion engines. To attain the objects of this invention, a continuously variable transmission should be used to transmit the power of the engine to the driving wheels of the vehicle, but the detailed construction of such a transmission is not a part of this invention, and it will be understood that any suitable transmission may be used. It is understood that a variable transmission is not a slipping clutch or equivalent power waster, but a device capable of delivering to the vehicle wheels substantially all of the power put into it by the engine at various drive ratios, a decrease in speed of its output shaft being accompanied by an increase in the torque thereof, and vice versa, for a given power input, the following relationship holding true for any drive ratio:

$$\text{Drive ratio} = \frac{\text{Wheel rev./min.}}{\text{Engine rev./min.}} =$$
$$\text{Transmission efficiency} \times \frac{\text{Engine torque}}{\text{Wheel torque}}$$

It is preferred that the transmission be so constructed that the drive is always a one-way drive, "free-wheeling" in all ratios both forward and reverse, and in the following description, this characteristic is assumed.

The salient object of this invention is to provide a complete control system for a vehicle driven by an internal combustion engine, more logical in concept than the control system now in common use, more convenient to operate in performing every necessary control function under all operating conditions, simpler and safer to handle, and operable by any driver to obtain maximum fuel mileage yet with the full power of the engine always available on demand for acceleration and top speed.

To point out the more specific objects of this invention, it is necessary to discuss the conventional automobile control system and also the operating conditions of the automobile engine.

The conventional automobile control system is not logical because it was not worked out from the functional basis. Instead of providing a system for controlling the automobile, means have been provided for handling the engine, clutch, and transmission. For example, to accelerate the car from a standstill, it is necessary to manipulate not only the accelerator, but also the clutch pedal and gear shift lever, and the kind and extent of manipulation required has no direct relationship with the results obtained in acceleration of the vehicle.

An object of this invention is to provide a simple and logical control system for the vehicle, rather than for the component parts thereof. Offhand one would think that the simplest control system would be that having the fewest pedals and levers. It has been proposed, for example, to control an automobile with the steering wheel and a single pedal, the brakes being applied by the pedal return spring. It has also been proposed to concentrate all control functions except steering in a single lever. However, experience shows that simplicity in control is not to be gained by concentrating a multiplicity of functons in a single control agency in this manner. The most logical control system, and the simplest system to control, is that in which each control agency has but a single function, and is operable independently from all the other control agencies in controlling that function.

The essential control functions are easily outlined. It is necessary to steer, to determine whether the car is to be driven forward or backward, and to control the speed. In other words, mathematically speaking, control of a motor vehicle is a matter of controlling the direction, the sign, and the magnitude, of the velocity. Control of the magnitude of the velocity, or speed control, is a matter of acceleration and deceleration; both may be managed by a single driver-operable agency, but it is preferable to provide separate agencies.

An object of this invention is to provide a control system, for a vehicle driven by an internal combustion engine, having separate and independently operable control agencies by which the direction, the sign, and the magnitude, respectively, of the vehicle velocity, may be controlled by the driver. Another object is to provide a speed control system for a vehicle driven by an internal combustion engine, by which more acceleration can be had simply by further continuous movement of the accelerator, without any bother about shifting gears; in other words, a speed control system by which the driver can get more speed at any time, up to the maximum obtainable by the full power of the engine, merely by "stepping on it".

Another object is to provide a motor vehicle control system from which the usual gear shift and hand brake levers have been eliminated, and with which the driver need not take his hands from the steering wheel while driving. Another object is to provide a control system by which the car may be driven alternately forward and backward, as when turning around or parking in close quarters, without removing the hands from the steering wheel, and with great convenience and precision. Another object is to provide conveniently operable means for holding the brakes engaged when the car is parked, without any hand brake lever for applying the brakes in the usual manner.

It is desirable also to provide "two independent braking systems" as specified in numerous State laws, and in a manner obviating any necessity for using the engine as a brake.

It is a further object of the invention that the control system provided shall be easy to learn how to operate, easy to operate, and consistent with present driving habits of the public.

Many of the foregoing objects could be easily attained if the vehicle were driven by an electric motor or a steam engine, but their attainment has not ordinarily been considered possible with an internal combustion engine because of such well known limitations as the inability of such an engine to start under load, low torque at low engine speed, relatively poor part-load fuel economy, etc. To point out more clearly the objects of this invention relative to providing the desired control system for a vehicle driven by an internal combustion engine, reference is had to the drawings, in which the operating conditions of such a vehicle and engine are graphically portrayed, and various phases of the invention are illustrated.

In the drawings,

Fig. 1 is a chart showing the horsepower required to maintain speed on a level road for a given car, at various car speeds;

Fig. 2 is a chart showing the characteristic horsepower and specific fuel consumption curves of a given engine;

Fig. 3 is a chart showing gasoline mileage attainable at various car speeds, in a given car with a continuously variable transmission, at selected engine speeds, and at selected engine load factors or throttle openings;

Fig. 4 is a chart showing the transmission drive ratios at various car speeds, at selected engine speeds, and at selected engine load factors or throttle openings;

Fig. 5 is a diagrammatic view of an internal combustion engine, a governor for the speed thereof shown partly in section, and a variable transmission;

Figure 7:
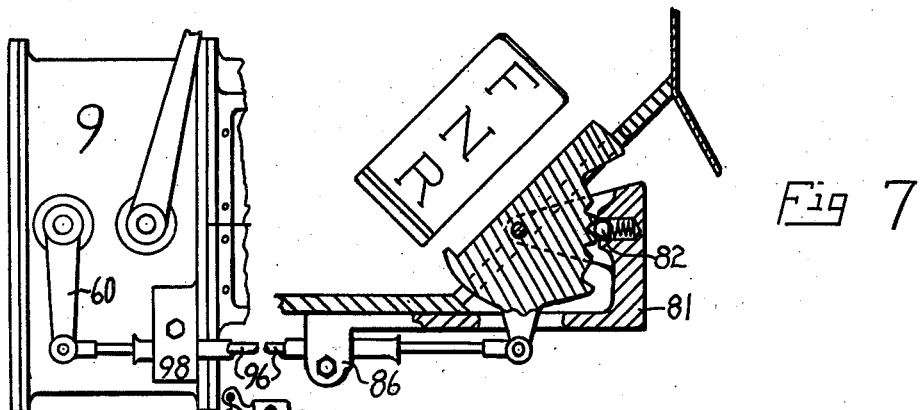
Fig. 7 is an elevational view, partly in section, of the control for the sign of the velocity—the forward and reverse control of Fig. 6—showing operable connection with the transmission of Fig. 5.

In Figs. 1-4 inclusive of the drawings, and in the following discussion thereof, operating conditions for a specific car and engine are shown and discussed as a means of explaining clearly some of the objects of the invention. Obviously, variations in the curves and in the quantities involved will occur when the method is applied to other cars and engines.

The required horsepower shown in Fig. 1 was estimated for a streamlined sedan. The characteristic engine curves shown in Fig. 2 are representative of an engine 40 H. P. suitable for the car of Fig. 1. The maximum brake horsepower which this engine can develop is shown by the curve marked "Max. B. H. P.". The specific fuel consumption in lbs./B. H. P. hr. at one-quarter, one-half, three-quarter, and full throttle, is shown in the curves marked .25, .50, .75, and 1.00, respectively.

From the data shown in Figs. 1 and 2, the gasoline mileage obtainable on level roads, at various car speeds, has been estimated and plotted in Fig. 3, and the corresponding transmission drive ratios, in Fig. 4. Note that the "drive ratio" of the transmission is defined as the ratio of wheel speed to engine speed. In other words, the "drive ratio" is the reciprocal of what is usually termed the "overall gear ratio", and includes not only the change in ratio in the transmission itself, but also that in the final drive reduction. For example, at zero drive ratio, the engine can run freely without driving the car; at a drive ratio of 0.5 the engine turns twice for each turn of the wheels.

It is well known, in general, that maximum gasoline mileage is to be had by running the engine at the lowest speed at which the required power can be smoothly delivered. An engine may idle smoothly about 400 rev./min., but for smooth operation under load, may preferably be run somewhat faster, say at about 600 rev./min. According to Fig. 2, the engine under consideration will turn out 8 B. H. P. with the throttle wide open at 600 rev./min. From Fig. 1, this much power will maintain a car speed of about 40 mi./hr. To maintain any speed below 40 mi./hr., the engine power must be reduced by throttling while the engine speed remains constant; to maintain any speed above 40 mi./hr., the engine must be allowed to run faster than 600 rev./min. in order to develop the required power.

Maximum acceleration, however, can be had at any car speed, by running the engine at wide open throttle at the speed of peak horsepower, which in this case, is at 3500 rev./min. No faster engine speed is useful or desirable for any purpose whatever.

These conditions are clearly shown in Fig. 3, and the corresponding transmission drive ratios, in Fig. 4. For economy, operation should be consistent with the top curves of each network; for maximum acceleration, operation should be consistent with the bottom curve of each network. Maximum economy and maximum acceleration obviously cannot be had at the same time, but it is an object of this invention to provide automatic control means for maintaining the conditions which produce maximum economy, and driver-operable control means by which the driver can obtain maximum acceleration when desired. In other words, referring to Figs. 3 and 4, the object is to provide automatic control means for maintaining operation consistent with the top curve of each network, and driver-operable control means for shifting the operation from the top curve toward the bottom curve as a limit. It is a further object to arrange the automatic control so that the drive ratio is reduced to zero whenever the engine is running at idling speed, to obviate the possibility of stalling the engine.

The duty of the automatic control, therefore, is to maintain the drive ratio at zero when the engine is idling, and to raise the drive ratio when the engine speed is increased above the idling range, varying it so that the engine speed is kept substantially constant or uniform at a certain slow speed somewhat above the idling range. Obviously this control function can be performed by any suitable constant speed engine governor. Ordinarily a governor maintains the speed of an engine constant by controlling the input; in this case, however, the engine speed is to be governed by controlling the output. Tendency of the engine speed to increase above the desired uniform speed must cause the governor to raise the drive ratio, holding down the engine speed by requiring the engine to do more work. Tendency of the engine to decrease in speed must produce a lower drive ratio to permit the engine to maintain the desired uniform speed.

The duty of the driver-operable control is the same whether temporary acceleration or top speed is desired, and is to reduce the drive ratio by adjusting the governor so that the governed engine speed is raised to a higher value not exceeding the speed of peak horsepower. This function has to do with car acceleration, and is properly associated with the accelerator. The complete duty of the driver-operable accelerator is to open the engine throttle, and then, by adjusting the governor, to raise the engine speed toward the speed of peak horsepower as a limit.

The governor should function normally as above described when the engine is warmed up to operating temperatures, but the control should be so arranged that governor action will adapt itself properly to operating conditions when the engine is cold, as on a winter morning. It is well known that a cold engine will not idle well as slowly as a hot one, and neither will it pull well at slow speeds. It is an object of this invention to provide an operable connection between the accelerator and governor such that the transmission drive ratio will be held at zero automatically over a higher range of idling speeds while the engine is cold, and whereby the drive ratios maintained by the governor will be somewhat lower while the engine is cold than when it is hot, thus permitting the cold engine to run faster until it gets warmed up.

These and other objects may be attained in accordance with the invention, which may be briefly described as a vehicle control system comprising an internal combustion engine; a variable transmission; a governor responsive to engine speed and operable to vary the drive ratio of the transmission; an accelerator pedal operably connected to the fuel feed system of the engine and, by hydraulic means, to the governor; a forward and reverse control operably connected to the transmission; the usual steering control; a brake pedal for operating the wheel brakes in the usual manner; and manually operable means for locking the brake pedal in position with the brakes engaged when the vehicle is parked.

Figure 6:
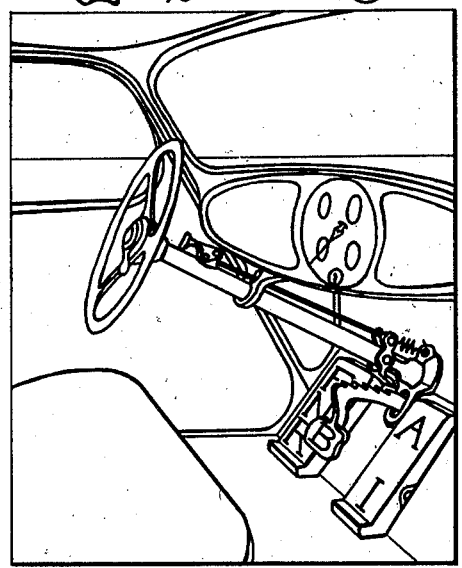
Fig. 6 is a perspective view of a vehicle control system constructed in accordance with the invention, as seen from the driver's compartment.

Referring to the drawings, engine 7, governor 5, and variable transmission 9 are shown in Fig. 5. The control system as viewed in the driver's compartment of the vehicle is shown in Fig. 6. The various driver-operable control agencies are shown in greater detail in Figs. 7, 8, and 9. Portions of Fig. 5 are reproduced in Figs. 7 and 8 to show the interconnection of the driver-operable control agencies to engine 7, governor 5, and transmission 9.

The usual steering wheel S is provided to control the direction of the vehicle velocity. Pedal FNR is provided to control the sign of the velocity. Pedal AI controls acceleration by advance movement and returns to the position corresponding to idling speed of the engine. Brake pedal B is connected to the usual wheel brakes of the vehicle in the usual manner. Pedals AI and B together comprise means for controlling the magnitude of the vehicle velocity or car speed. Lever P enables the driver to lock the brakes in engagement for parking. It is assumed that when the ignition switch is turned on, the engine will start automatically, and that suitable automatic controls of well known types are provided for choke and mixture adjustment suitable for all operating conditions.

Pedal FNR is a rocker pivoted between arms of support 81. Three notches on pedal FNR engage spring pressed ball 82, providing three definite stopping positions for pedal FNR, easily appreciated by the driver, and corresponding to forward, neutral, and reverse positions respectively of forward and reverse control lever 60 of transmission 9, to which pedal FNR is operably connected by suitable means such as push-pull cable 96, the conduit of which is clamped in clamps 86 and 98.

Pedal AI is also a rocker, pivoted on support 83. Levers 87 and 88 are also pivoted on support 83. Two cams, A7 and A8, on the under side of pedal AI, engage respectively an arm on each of levers 87 and 88. The lower end of lever 87 is operably connected by any suitable means such as cable 75 to throttle lever 77 of carburetor 78 mounted on intake manifold 79 of engine 7. Return spring 76 urges throttle lever 77 toward idling stop 74.

The lower end of lever 88 is operably connected by any suitable means such as cable 95 to control valve 50 of engine governor 5. Pump 51, driven by the engine in any suitable manner, takes oil from sump 70 and delivers it into passage 52. Governor shaft 54 may be the cam shaft of engine 7, or may be driven by engine 7 in any other suitable manner. Keyed to shaft 54 is support 55 pivoted to which are the governor weights 56 having arms riding in a groove on sleeve 57 which forms a cylinder slidable on piston 40 formed as an enlarged end of governor shaft 54.

Governor shaft 54 is hollow and forms a conduit leading from passage 52 to cylinder 57. Spring 41 is fitted into a counterbore in piston 40 and bears against head 58 of cylinder 57, the thrust of spring 41 tending to push cylinder 57 off from piston 40, resisting the action of governor weights 56 which, in operation, tend to pull cylinder 57 onto piston 40, by centrifugal force.

Cylinder head 58 might be integral with cylinder 57, but as shown, is held onto cylinder 57 by sleeve nut 59 which latter also forms a guide for valve 42 and a spring rest for valve spring 43. Valve 42 forms a closure for the opening in cylinder head 58, and is pressed against its seat by spring 43.

Cylinder sleeve 57 carries, in another groove on its exterior, collar 45, operably connected by arms 46 to shaft 47 which extends outside the governor housing and carries lever 48, connected by link 49 to lever 30 of transmission 9. Lever 30 may represent the drive ratio control means of transmission 9. The position shown in Fig. 5 may correspond to zero drive ratio. Movement of lever 30 to the left, as indicated in Fig. 5, operates to raise the drive ratio from zero to a suitable maximum, which in the particular vehicle under consideration, may be 0.8 in accordance with Fig. 4.

Brake pedal B may be connected to the wheel brakes in the usual manner. For symmetry, pedal B is centered directly beneath the steering column, rockers FNR and AI being equally spaced on either side. The segment portion of pedal B which passes thru the toe board, is located further forward than usual, in a position adjacent to the steering column, and is provided with teeth B3. Parking brake control lever P is connected by pull link P2 with dog P3, which may engage ratchet teeth B3 by the action of spring P4.

Figure 9:
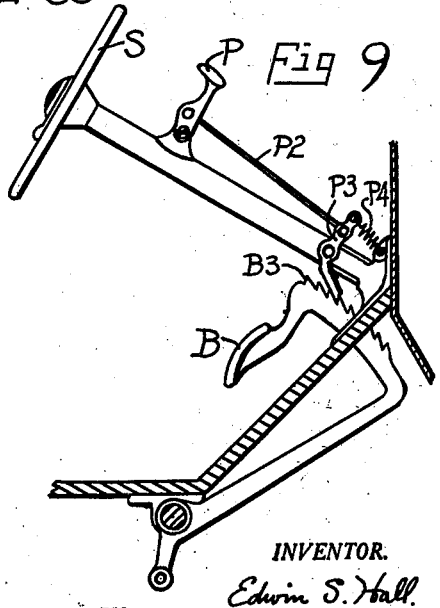
Fig. 9 is an elevational view of the brake pedal and steering column of Fig. 6, showing the parking brake control.

In operation, starting with the condition when the car is parked with the brakes locked, lever P and associated parts are in the position shown in Fig. 9. The engine may be started by inserting the ignition key in the lock on the instrument board. To release the brakes, press down on brake pedal B to remove the load from dog P3, and pull lever P down into the position shown in Fig. 6, at which time, link P2 will have gone by center of the pivot of lever P so that the action of spring P4 will maintain the parts in position with dog P3 out of the path of teeth B3. The spring action will also take up any play in the parking brake control mechanism to prevent rattles while the car is in motion. Brake pedal B may now be released to the position shown in Fig. 6.

To start the car forward, with the engine idling, push pedal FNR forward from neutral to forward position, and press forward on accelerator pedal AI until the desired acceleration is obtained.

During the first portion of the movement of pedal AI, cam A7 acts to advance lever 87 and cable 75 causing throttle 77 to open, but this portion of cam A8 is circular relative to the axis of pedal AI, and causes no movement of lever 88. The engine speed increases somewhat above the idling range, and governor weights 56 fly outward by centrifugal force, pulling sleeve 57 onto piston 40, compressing spring 41. As sleeve 57 moves to the left, as shown in Fig. 5, collar 45 is moved also, operating levers 46, shaft 47, lever 48, link 49, and lever 30, to advance the drive ratio of the transmission, thereby starting the car.

Spring 41 is so chosen as to balance the centrifugal force of weights 56 at an engine speed of about 600 rev./min. If the engine speed tends to increase, increased centrifugal force will operate to advance the drive ratio, thru the linkage above described, thus requiring the engine to do more work and holding the speed uniform. If the power required is greater than the throttle opening permits the engine to develop at the governed speed, the engine will tend to slow down, the centrifugal force of weights 56 will grow less, and spring 41 will act to move sleeve 57, and thru the linkage, lever 30, to the right as seen in Fig. 5, thus reducing the drive ratio and permitting the engine to maintain its speed. If the engine speed is forced down toward idling speed by an overload, the drive ratio will be reduced toward zero by spring 41 whose initial loading is greater than the opposing centrifugal force in the idling speed range, so that stalling of the engine is prevented.

Figure 8:
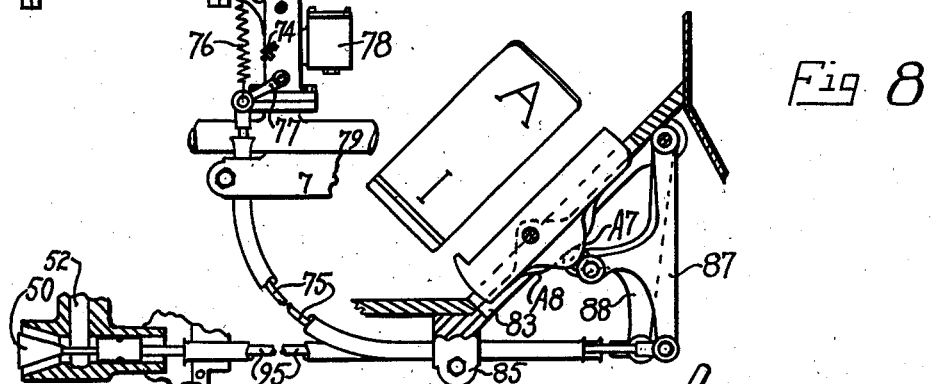
Fig. 8 is an elevational view, partly in section, of the accelerator pedal of Fig. 6, showing operable connection with the engine and governor of Fig. 5.

When pedal AI has reached the midway position shown in Fig. 8, cam A7 has advanced lever 87 to the point where throttle 77 has been fully opened. Further movement of pedal AI will merely maintain throttle 77 wide open, as the remaining portion of cam A7, shown above the arm of lever 87 in Fig. 8, is circular relative to the axis of pedal AI.

The portion of cam A8 already traversed by the arm of lever 88 up to the point shown in Fig. 8, is also circular, and has produced no movement of lever 88. At about the time throttle 77 approaches wide open position, cam A8 begins to advance lever 88, pulling control cable 95 toward closing valve 50. The oil which has been flowing freely out of passage 52, thru valve 50, back into sump 70, now finds increasing difficulty in getting thru valve 50, so that pressure is built up in passage 52, extending thru hollow shaft 54, to cylinder 57, where it reinforces the action of spring 41 to push cylinder 57 away from piston 40. The effect is the same as tho spring 41 were strengthened, so that more centrifugal force from weights 56 is required to make a balance; consequently the governed speed of the engine is raised above 600 rev./min.

The extent to which valve 50 is closed, determines the pressure developed on the oil in cylinder 57, and the extent to which the governed speed of the engine is raised. If valve 50 is entirely closed, by full advance of pedal AI, the oil from pump 51 has no place to go, and will build up pressure until it overcomes that of relief valve spring 43, causing valve 42 to open. Spring 43 is chosen of such strength that it will produce a maximum pressure in cylinder 57 which, added to the thrust of spring 41, will be strong enough to balance the centrifugal force of weights 56 when the engine speed has reached aproximately 3500 rev./min., the speed of maximum horsepower of the engine. With the engine governed at this speed, the full power of the engine is being delivered, and by the governor action, it is applied at the optimum drive ratio. Operation will be in accordance with the lower curve of Fig. 4, and will produce maximum acceleration, and if continued, top speed of the car.

When the driver desires less speed, release of pedal AI to the midway position shown in Fig. 8 will open valve 50, releasing the pressure in cylinder 57, and returning the governed engine speed to about 600 rev./min. Full return of pedal AI will close throttle 77 to the idling position, reducing the engine speed to idling and the drive ratio to zero by the operation of spring 41 as above described.

When starting the car with a cold engine, the oil in sump 70 is cold and has a higher viscosity than after the engine is well warmed up. Valve 50 when open, as shown in Fig. 5, will pass freely the full flow of oil from pump 51 when the oil is hot, but will restrict the flow when the oil is cold, thus building up pressure in passage 52 and cylinder 57, which pressure varies with the viscosity of the oil. Until the oil is warmed up, therefore, the pressure in passage 52 and cylinder 57 will be higher, so that the engine may idle at higher speeds before the centrifugal force of weights 56 can overcome spring 41 plus the pressure, to raise the drive ratio above zero. Similarly, all governed engine speeds will be somewhat higher than when the oil viscosity is less, thus permitting the engine to operate at higher speeds until it is warmed up, as is desired.

Control of the car running in reverse is exactly the same as for forward speeds except that the heel of pedal FNR is depressed to put the transmission into reverse.

Since free-wheeling is to be automatic at all times, it is not convenient to use the engine as a brake, and equivalent braking capacity must be provided to supplement the usual wheel brakes. It is assumed that this additional braking capacity can be provided in transmission 9, and that pedal FNR can be rocked into neutral, or even into reverse when going forward and vice versa, without any result other than to retard the car, providing a fully adequate two-wheel braking system entirely independent from the usual four-wheel brakes.

When it is necessary to drive the car alternately forward and backward, as when turning around or parking in close quarters, pedal FNR may be used as a two-way clutch pedal. With pedal FNR in neutral, pedal AI may be advanced slightly to open the throttle so that the engine will have sufficient speed and power. Then, with both hands free to operate steering wheel S, the car may be driven forward or reverse merely by rocking pedal FNR, the car responding to the movement of the pedal in either direction.

When the car is parked, the brakes may be engaged by depressing pedal B, and may be locked in engaged position by releasing parking brake control lever P.

From the foregoing, it is seen that a complete vehicle control system, for a vehicle driven by an internal combustion engine, has been provided by which all the objects of this invention, as stated herein, may be attained. Driver-operable control agencies have been provided for controlling independently the direction, the sign, and the magnitude, of the vehicle velocity, and each control agency may be operated progressively and the desired extent of its movement may be judged by the immediate results in car activity. Car acceleration may be controlled by the accelerator alone, and will correspond in rapidity, under given conditions, to the rapidity with which the accelerator is advanced. The gear shift and hand brake levers have been eliminated, and the driver need never take his hands from the steering wheel when driving, not even when turning around or parking in close quarters, and the brakes may be conveniently locked in engaged position when the car is parked. By virtue of a continuously variable transmission or its practical equivalent, and the governor, any driver may obtain substantially the maximum fuel economy possible under any operating conditions from a given engine, yet the control of the governor and transmission is so arranged in connection with the accelerator that the full power of the engine may be applied at the will of the driver, merely by the full advance of the accelerator. Provision has been made in the control system whereby a cold engine may run faster to deliver a given required amount of power than after it has warmed up, and provision has also been made in the control system to prevent the engine from stalling. Yet the control system provided is simple and easy to operate, and is easy to learn how to operate, being consistent with the present driving habits of the public.

While particular mechanisms have been illustrated and described, it will be understood that changes and modifications in the construction and in the arrangement of the control system and the various parts thereof may be made without departing from the spirit or scope of the invention as expressed in the following claims.

I claim:

1. A vehicle control system comprising, in combination, an internal combustion engine, means for controlling the fuel feed to said engine, a continuously variable transmission, means for controlling the drive ratio of said transmission, a centrifugal governor responsive to engine speed and operably connected to said drive ratio controlling means to vary the drive ratio of said transmission as a means of maintaining the speed of said engine at a uniform rate, hydraulically operable means for adjusting said governor to cause it to maintain the speed of said engine at a higher rate, an accelerator operable by the driver to accelerate said vehicle, cams associated with said accelerator, a cam follower operably connecting one of said accelerator cams to said fuel feed controlling means, a cam follower operably connecting another of said accelerator cams to said hydraulically operable governor adjusting means.

2. A vehicle control system comprising, in combination, an internal combustion engine, means for controlling the fuel feed to said engine, a continuously variable transmission, means for controlling the drive ratio of said transmission, a centrifugal governor responsive to engine speed and operably connected to said drive ratio controlling means to vary the drive ratio of said transmission as a means of maintaining the speed of said engine at a uniform rate, hydraulically operable means for adjusting said governor to cause it to maintain the speed of said engine at a higher rate, an accelerator operable by the driver to accelerate said vehicle, operable connections between said accelerator and said fuel feed control means and between said accelerator and said hydraulically operable governor adjusting means whereby movement of said accelerator to accelerate said vehicle will increase the fuel feed to said engine and subsequently adjust said governor to cause it to maintain the speed of said engine at a higher rate.

3. A vehicle control system comprising, in combination, an internal combustion engine, means for controlling the fuel feed to said engine, a variable transmission capable of delivering to the vehicle wheels substantially all the power put into it by said engine at various drive ratios, means for controlling the drive ratio of said transmission while it continues to deliver substantially all the power of said engine, a governor responsive to engine speed and operably connected to said drive ratio controlling means to vary the drive ratio of said transmission as a means of maintaining the speed of said engine at a uniform rate, means for adjusting said governor to cause it to maintain the speed of said engine at a higher rate, an accelerator operable by the driver to accelerate said vehicle, and independent operable connections between said accelerator and said fuel feed control means and between said accelerator and said governor adjusting means, said independent operable connections so constructed and arranged that, upon movement of said accelerator to accelerate said vehicle, the resulting movements of said fuel feed control means and said governor adjusting means may be predetermined in any desired relationship whether coincidental or overlapping or in sequence.

4. A vehicle control system comprising, in combination, an internal combustion engine, means for controlling the fuel feed to said engine, a variable transmission capable of delivering to the vehicle wheels substantially all the power put into it by said engine at various drive ratios, means for controlling the drive ratio of said transmission, a governor responsive to engine speed and operably connected to said drive ratio controlling means, means for adjusting said governor, a vehicle accelerator operable by the driver, and independent operable connections between said accelerator and said fuel feed control means and between said accelerator and said governor adjusting means.

5. A vehicle speed control system comprising an internal combustion engine, a continuously variable transmission, a governor responsive to engine speed and operable to vary the drive ratio of said transmission, an accelerator operable by the driver to accelerate the vehicle, an operable connection between the accelerator and the fuel feed system of the engine, and an operable connection comprising hydraulic means between the accelerator and the governor, each of said operable connections including a cam and cam follower.

6. A vehicle speed control system comprising, in combination, an internal combustion engine, a continuously variable transmission, a governor responsive to engine speed and operable to vary the drive ratio of said transmission, an accelerator operable by the driver to accelerate the vehicle, operable cam connections between said accelerator and the fuel feed system of said engine and between said accelerator and said governor.

7. In a vehicle control system, means for controlling acceleration comprising an internal combustion engine, means for controlling the fuel feed to said engine, a continuously variable transmission, means for controlling the drive ratio of said transmission, a governor responsive to engine speed and operably connected to said drive ratio controlling means, means for adjusting said governor, an accelerator pedal operable by the driver, and cam means associated with said pedal and operably connected to said fuel feed control means and to said governor adjusting means.

8. In a vehicle control system, an internal combustion engine, a continuously variable transmission, automatic control means responsive to the speed of said engine and operable to vary the raio of said transmission as a means of maintaining the speed of said engine substantially constant somewhat above the idling range, and driver-operable control means for increasing the power of said engine and for adjusting by hydraulic means the engine speed maintained by said automatic control toward the engine speed of peak horsepower as a limit.

9. In a vehicle control system, an internal combustion engine, a continuously variable transmission, centrifugally operable means responsive to the speed of said engine and operable to increase the drive ratio of said transmission, spring means opposed to said centrifugally operable means, hydraulic pressure means opposed to said centrifugally operable means, and a driver-operable accelerator to increase the power of said engine and to increase the pressure of said hydraulic pressure means.

10. In a vehicle control system, an internal combustion engine, means for controlling the fuel feed to said engine, a continuously variable transmission, means for controlling the drive ratio of said transmission, a driver-operable vehicle accelerator, cams on said accelerator, a cam follower for one of said cams operably connected with said fuel feed control means, and a cam follower for another of said cams operably connected to said drive ratio control means.

11. In a vehicle control system, in combination, an internal combustion engine, means for controlling the fuel feed thereto, a variable transmission capable of delivering to the vehicle wheels substantially all the power put into it by said engine at various drive ratios, governor means responsive to an increase in engine speed above a suitable idling speed range and operable to increase the drive ratio of said transmission, means operable to maintain the drive ratio of said transmission at zero when the speed of said engine is less than the maximum idling speed and to oppose the increase of said transmission drive ratio by said speed responsive governor means when said engine speed is increased above said idling speed range, and a driver-operable accelerator operably connected independently to said fuel feed control means and to said governor means so as to increase the fuel feed to said engine and to oppose the action of said governor means on the drive ratio of said transmission in any desired predetermined relationship.

12. In a vehicle control system, an internal combustion engine, a continuously variable transmission, centrifugally operable means responsive to the speed of said engine and operable to increase the drive ratio of said transmission, spring means opposed to said centrifugally operable means, hydraulic pressure means opposed to said centrifugally operable means, a driver-operable vehicle accelerator to increase the power of said engine and to increase the pressure of said hydraulic pressure means, and a maximum pressure relief valve to limit the pressure of said hydraulic pressure means.

13. In a vehicle control system, an internal combustion engine, means for controlling the fuel feed to said engine, a variable transmission capable of delivering to the vehicle wheels substantially all the power put into it by said engine at various drive ratios, automatic means responsive to engine speed and independently operable to control the drive ratio of said transmission thereby governing the speed of said engine, means for adjusting said automatic means to permit faster engine speed, a driver-operable accelerator, and independent operable connections between said accelerator and said fuel feed control means and between said accelerator and said adjusting means.

14. A speed control system for a motor vehicle comprising, in combination, an internal combustion engine, driver-operable means for controlling the fuel feed thereto, a variable transmission capable of delivering to the vehicle wheels substantially all the power put into it by said engine at various drive ratios, automatic transmission control mechanism responsive to engine speed and independent at all times of said fuel feed control means for maintaining the drive ratio of said transmission at zero when the engine is stopped or running at idling speed and at other times maintaining said drive ratios such that the engine will run at substantially the slowest speed at which it can deliver the required power smoothly, and driver-operable control means for altering the action of said automatic transmission control mechanism to permit the engine speed to increase up to the speed of maximum engine power output as a limit.

15. In a speed control system for a motor vehicle, in combination, a continuously variable transmission having driving and driven members, governor means responsive to the speed of said driving member for controlling the drive ratio of said transmission and comprising centrifugally operable means, spring means opposed to said centrifugally operable means, an oil pump driven by said driving member and capable of producing fluid pressure to aid said spring means, and operator-operable means for throttling the output of said pump to increase said fluid pressure.

EDWIN S. HALL.